Jan. 2, 1945. G. B. ZOIS 2,366,377
FLORAL DESIGN
Filed Dec. 5, 1941
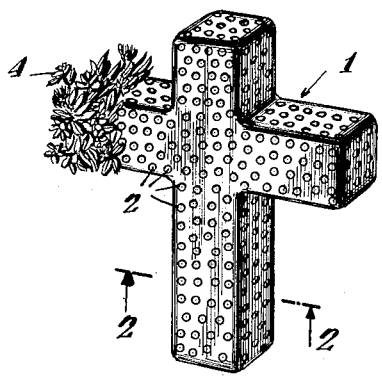
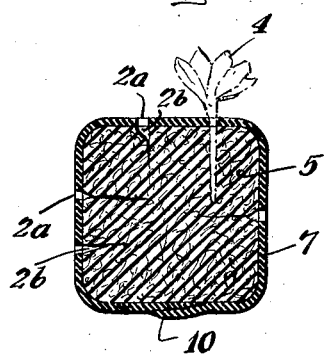
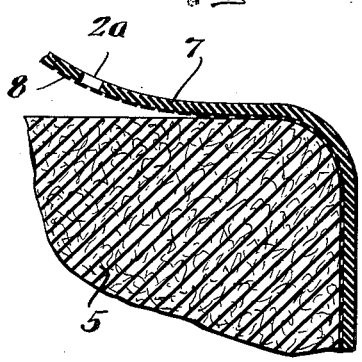
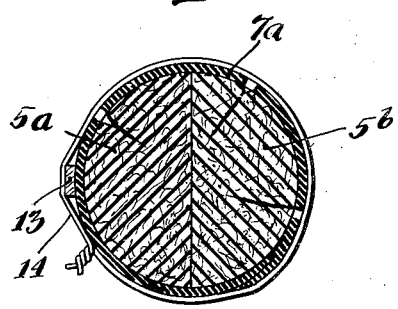
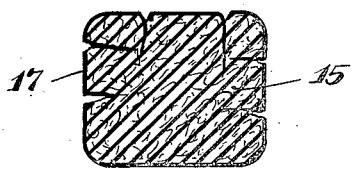
INVENTOR.
George B. Zois
BY
Norman R. Holland
ATTORNEY Patented Jan. 2, 1945

2,366,377

UNITED STATES PATENT OFFICE 2,366,377

FLORAL DESIGN

George B. Zois, Bronx, N. Y.

Application December 5, 1941, Serial No. 421,713

3 Claims. (Cl. 47—41)

The present invention relates to a form or foundation for use in making floral decorations or designs.

Floral decorations or designs are generaly made by first building up a foundation or form and then attaching flowers, leaves, et cetera, to the foundation. Generally, the foundation is made by first selecting an appropriate wire frame, padding or filling the frame with moss and then tying the moss in place, wrapping waxed paper around the moss, and finally securing the paper to the moss and the frame by wrapping and tying it with twine. Laurels or other greenery may then be placed over the waxed paper and tied to the waxed paper; flowers are usually put on the form by first wiring them to sticks and then inserting the sticks through the paper into the moss. The stem of the flower itself does not ordinarily project into the body of the moss and therefore the flower gets no sustenance from the moss. Also, the moss does not hold the flower sticks and the flowers firmly in position. The manufacture of the form or foundation for a floral decoration generally requires about twice as much time as it does to attach the flowers to sticks and then to insert them into the form. In addition to the time and trouble required to make a form, there are other objections to the foregoing method, chiefly in connection with the moss used to pad or build up the forms.

One of the important objections to moss forms is that the moss frequently does not hold its shape. Furthermore, a considerable amount of moss must be kept on hand by florists and this requires a large storage space. Keeping the moss on hand is unsanitary and unhealthy for it attracts rodents and insects, particularly cockroaches. In addition, particles of moss frequently fall out of a form or a floral design to litter up the floor and nearby articles. Also, the moss may give off an objectionable odor when a floral design, of which the moss comprises a part, is watered and left to stand for a few days.

The present invention aims to overcome the above and other disadvantages and difficulties by providing a new and improved form or foundation adapted to be used in building up floral designs.

An object of the present invention is to provide a new and improved form or foundation for floral designs.

Another object of the present invention is to provide an improved form adapted to more securely hold flowers and the like in position.

Another object of the invention is to provide a foundation for floral designs which is adapted to retain moisture over relatively long periods of time.

Still another object of the present invention is to maintain flowers and greenery or verdure on a floral design fresh for a considerable period of time.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a perspective view illustrating a preferred embodiment of the invention in the shape of a cross;

Fig. 2 is a sectional view taken along the line 2—2 of Fig. 1;

Fig. 3 is a fragmentary sectional view illustrating a step in the manufacture of the preferred embodiment of the invention;

Fig. 4 illustrates a modified form of the invention; and

Fig. 5 illustrates another modified form of the invention.

Referring again to the drawing, and more particularly to Figs. 1 to 3 thereof, there is illustrated a form or foundation I for a floral design in the shape of a cross. The form is shown in the shape of a cross for illustrative purposes only; the form or foundation may be made into any other desired shape, e. g., circles, anchors, crescents, stars, and the like. The form I is provided with apertures or recesses 2 adapted to receive and hold the stems of flowers or other plants 4. In most instances a majority of the recesses 2 will be provided at the front of the particular form and a smaller number at the sides thereof, since it is the front which is most exposed to view. The rear of a form is not ordinarily seen when a device is on display and hence it need not be provided with recesses for insertion of flowers. The form I preferably comprises a core or central part 5 made of sponge rubber, adapted to receive and retain water, surrounded by or encased preferably in a jacket of solid, vulcanized or non-sponge rubber 7. Any suitable material other than solid or vulcanized rubber may be utilized for the cover 7; for example, a rubberized sheet, oil cloth, or other holding means. The term "solid" is intended to denote a rubber or other material of much greater density than the sponge rubber which constitutes the core 5 of the form 1. The plant holding apertures 2 extend through the solid rubber or other jacket 7 into the interior of the sponge rubber core 5 so that the stem of a plant 4 inserted into the recesses may be surrounded by sponge rubber for a substantial part of its length. This is advantageous for two reasons: firstly, the sponge rubber grips the stem securely but gently to minimize accidental falling out of the plant and, secondly, when the sponge rubber is moistened with water, it supplies water to the plant stem to keep it fresh for a considerable period of time. Water may enter the core 5 through the recesses 2 in the cover and core. Preferably the sponge rubber core is soaked with water prior to the insertion of the plant stems into the recesses 2. While the cover 7 might be omitted in some instances, its use is preferred since it contributes to the rigidity of the form by helping to hold the sponge rubber core firmly in position.

The solid rubber cover 7 is preferably provided with perforations 2a prior to being wrapped or otherwise placed in position about the sponge rubber core 5; the corresponding recesses 2b in the core 5 may be formed by forcing a sharp instrument through the perforations 2a after the cover 7 is in position about the core. In this way, the recesses 2b in the core 5 and the perforations 2a in the cover 7 are sure to be in alignment. The number, spacing and sizes of the perforations in the sheet 7 may be varied as desired but it is advantageous to place them sufficiently close together so that when the smallest type of flowers or plants are inserted into the openings 2, they will overlap sufficiently to cover adjacent portions of the form or foundation 1. When larger flowers are used, only part of the recesses need have flowers in them. The holes or apertures do not necessarily have to be large, for the cover 7 and the sponge rubber core 5 readily expand upon insertion of flower stems.

Preferably the sponge rubber core 5 and the solid rubber cover 7 are secured together by an adhesive 8 (Fig. 3) to prevent separation thereof and also to maintain the recesses of the cover and core in alignment with each other. Ordinary rubber cement has been found to work very well for this purpose, but any other suitable adhesive may be utilized. In Fig. 3, a layer of rubber cement 8 is shown applied to the cover 7 and the latter is being forced against the sponge rubber core 5. If desired, the cover 7 may be wrapped firmly about the core and the adhesive applied to only the overlapping joint 10 of the cover (Fig. 2); that is, the adhesive may be omitted entirely between the core 5 and cover 7 so that the sponge rubber core 5 and cover 7 are not adhesively secured together. It is desirable, however, to have the core and cover secured together by an adhesive adjacent the overlapping joint 10 of Fig. 2 as this minimizes the possibility of accidental movement of these parts with respect to each other.

The new decoration or design with a sponge rubber core has the advantage that a flower stem may be inserted through the apertures in the rubber sheet to embed in the sponge rubber core without the use of a wire and without the use of a stick. Where the stem of the flower is weak, it may be advisable to wrap it with wire. Ordinarily no sticks are necessary, hence the flowers may be inserted much more rapidly. By reason of the plant stems being located in the moist sponge rubber, they are maintained fresh for a much longer period of time. This minimizes complaints due to the fact that flowers wither quickly when not supplied with moisture.

It is customary for floral decorations to be sent at the time of a death or upon other occasions where they may be kept on view for two or three days before being discarded; in such instances, it is most desirable that the flowers or plants comprising the decoration be kept looking fresh. The present invention achieves this. The present form contributes toward a great saving in the amount of time required to make a floral decoration due to the fact that the sponge rubber may be kept in forms and quickly wrapped or encased, or, as illustrated in the preferred embodiment, the forms may be sold in readiness to receive flowers or plants.

In Fig. 4, the core is comprised of separate pieces or elements of sponge rubber 5a and 5b covered by a skin of solid rubber or other suitable material 7a. In certain instances it may be advantageous to build up a form in this manner from pieces or elements of sponge rubber, rather than to utilize a single piece of sponge rubber for the core. The thickness or cross sectional dimensions of a form may be readily varied by building it up from separate elements or sections in this manner.

Fig. 5 illustrates a cross section of a modified form of the invention wherein the core 15 and cover 17 are manufactured as a single integral unit. That is, the core and cover may be manufactured or formed in a mold of any suitable shape which leaves or provides a thin skin 17 of solid or non-sponge rubber entirely around the core portion 15. This modification obviates the step of adhering a separate cover about the sponge rubber core. Holes or recesses for receiving flowers may be easily punched or otherwise formed in the modified form of Fig. 5. The operation and advantages of this modified form are similar to those described in connection with the preferred embodiment.

The forms themselves generally possess sufficient rigidity to retain their shapes when made up into finished designs. If it should be desired to increase their rigidity they may be reinforced by utilizing a metal, wooden or other frame. In Fig. 4 one of the forms is shown secured to a reinforcing or stiffening frame 13 by a wire 14. The reinforcing means shown in Fig. 4 is illustrative of one type which may be used; various other types may be used.

The devices may be readily manufactured by first making a core shaped to conform generally to the particular floral design desired. The core may comprise a single piece of sponge rubber or may be built up by using separate pieces or elements. Thereafter the core is covered with or inserted into an outer covering of substantially moisture resistant material, preferably by the manufacturer. The outer covering and core may or may not be adhesively secured together, as desired. Ordinary vulcanized rubber is an excellent covering material for the core. If the covering has been supplied with perforations prior to its assembly with a core, recesses may be punched into the core by inserting a suitably shaped instrument through the cover perforations. If the cover has been applied without perforations in it, recesses or holes may be punched with an instrument simultaneously through both the cover and core. The modified form of Fig. 5 does not have a separate covering material placed about it; the thin outer portions constitute a moisture resistant material which extends about this particular form. After being provided with plant-receiving recesses the forms are in readiness for use by florists. The manufactured forms are then distributed to florists.

In using the device a florist preferably first soaks it with water by compressing and releasing it so that it absorbs and holds water. When the form has absorbed a sufficient amount of water, flower stems, leaves, grass, et cetera, may be inserted into the recesses of the form so that they combine to provide a floral design of natural and beautiful appearance. The flower and other plant stems are held firmly in place and withering is minimized. The design will absorb shocks during transportation without causing the plant stems to shake loose and fall out.

It will be seen that the present invention provides a new and improved form or foundation adapted to be used in building up floral designs. By utilizing it, floral designs last longer and keep their shapes better. Plant stems are held gently but firmly in position. The forms or foundations may be re-used, without deteriorating to any appreciable extent. The sponge rubber forms retain their shapes at all times and may be stored without attracting rodents or vermin.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A device of the class described comprising an article in the general shape of a floral design made of sponge rubber having a plurality of recesses in the surface thereof leading to and terminating in the body thereof adapted to receive and contain the cut ends of plant stems, an apertured sheet of vulcanized rubber adhered to the surface of said sponge rubber member to increase the rigidity thereof and to retain water therein, the apertures of said sheet registering with said recesses, and a rigid frame secured to said article to prevent substantial bending of the flexible parts thereof.

2. A device of the class described comprising an article in the general form of a floral design made of sponge rubber having a plurality of recesses in the surface thereof leading to and terminating in the body thereof adapted to receive plant stems, and a thin skin of rubber extending about the sponge rubber with the inner surface of the skin adhered to the outer surface of the sponge rubber, said skin having apertures therein registering with said recesses.

3. A device of the class described comprising an article in the general form of a floral design made of sponge rubber and a skin of rubber extending about the outer surface of the sponge rubber with the inner surface of the skin adhered to the outer surface of the sponge rubber, said skin having apertures therein to receive plant stems, which may be embedded in the body of the sponge rubber.

GEORGE B. ZOIS.